United States Patent [19]
Narayanan et al.

[11] Patent Number: 5,430,728
[45] Date of Patent: Jul. 4, 1995

[54] SINGLE-ROUTE BRAODCAST FOR LAN INTERCONNECTION

[75] Inventors: N. Anantha Narayanan, Nepean; James A. Cobban, Kanata; Pierre Cousineau, Nepean; Wing K. Ling, Kanata, all of Canada

[73] Assignee: Northern Telecom Limited, Montreal, Canada

[21] Appl. No.: 246,379

[22] Filed: May 19, 1994

Related U.S. Application Data

[63] Continuation of Ser. No. 990,775, Dec. 10, 1992, abandoned.

[51] Int. Cl.⁶ .............................................. H04J 3/02
[52] U.S. Cl. .................................................. 370/85.13
[58] Field of Search ............... 370/85.13, 85.14, 85.15, 370/85.12, 60, 94.1, 94.2, 94.3

[56] References Cited

U.S. PATENT DOCUMENTS

| | | | |
|---|---|---|---|
| 4,901,312 | 2/1990 | Hui et al. | 370/85.12 |
| 4,972,409 | 11/1990 | Backes | 370/85.13 |
| 5,018,137 | 5/1991 | Backes et al. | 370/85.14 |
| 5,088,090 | 2/1992 | Yacoby | 370/85.13 |
| 5,144,622 | 9/1992 | Takiyashu et al. | 370/85.13 |
| 5,150,360 | 9/1992 | Perlman et al. | 370/94.3 |

FOREIGN PATENT DOCUMENTS
9108627  6/1991  WIPO .

Primary Examiner—Douglas W. Olms
Assistant Examiner—Chau T. Nguyen
Attorney, Agent, or Firm—Yoshiharu Toyooka

[57] ABSTRACT

In LAN interconnect, it is necessary to perform route discovery to locate a destination device. A novel method of selecting designated source routing bridges and a new single-route broadcast scheme using those selected bridges are disclosed. The invention makes use of intelligent source routing bridges which connect LAN segments. In order to configure a single-route broadcast path to each connected LAN, a selection procedure is performed among source routing bridges according to the present invention to ensure that there is only one path between two connecting LAN segments. In one embodiment, a packet switching network is used as a WAN which interconnects many LAN segments by way of a virtual ring created in the WAN and the present invention chooses only one path between the individual LAN segment and the virtual ring.

5 Claims, 6 Drawing Sheets

Tsd - Sedative timer
Tcnt - Contention timer

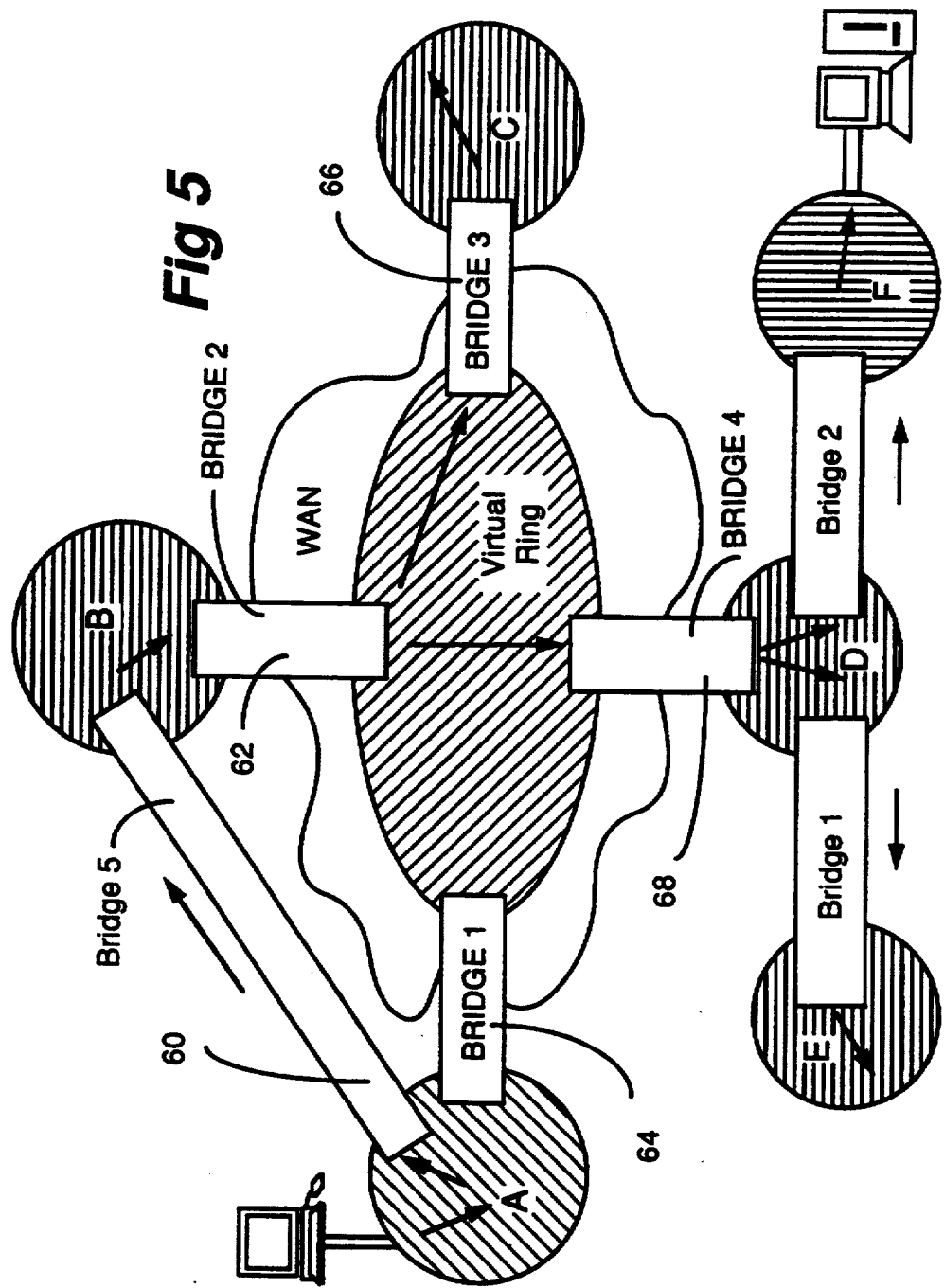

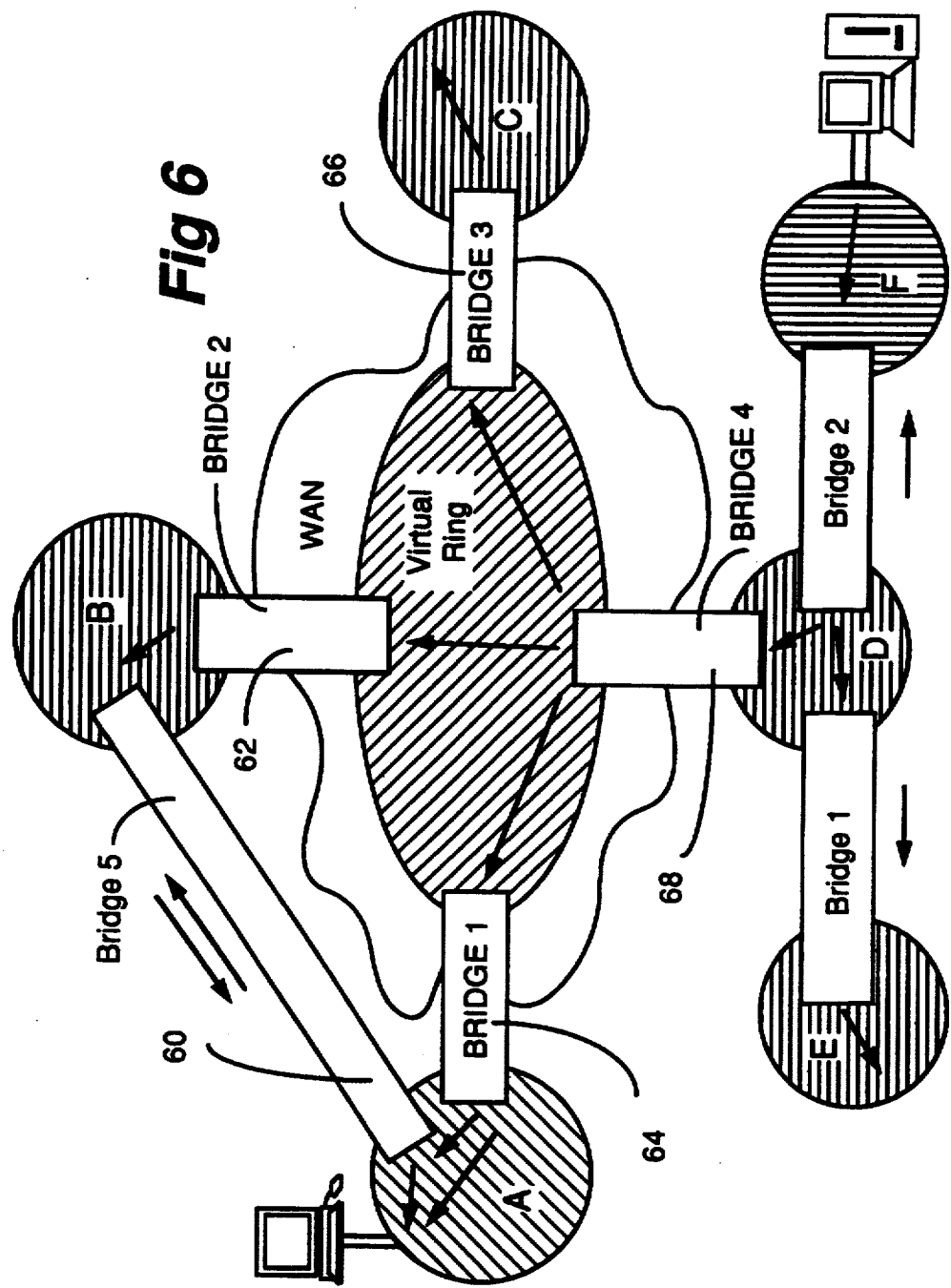

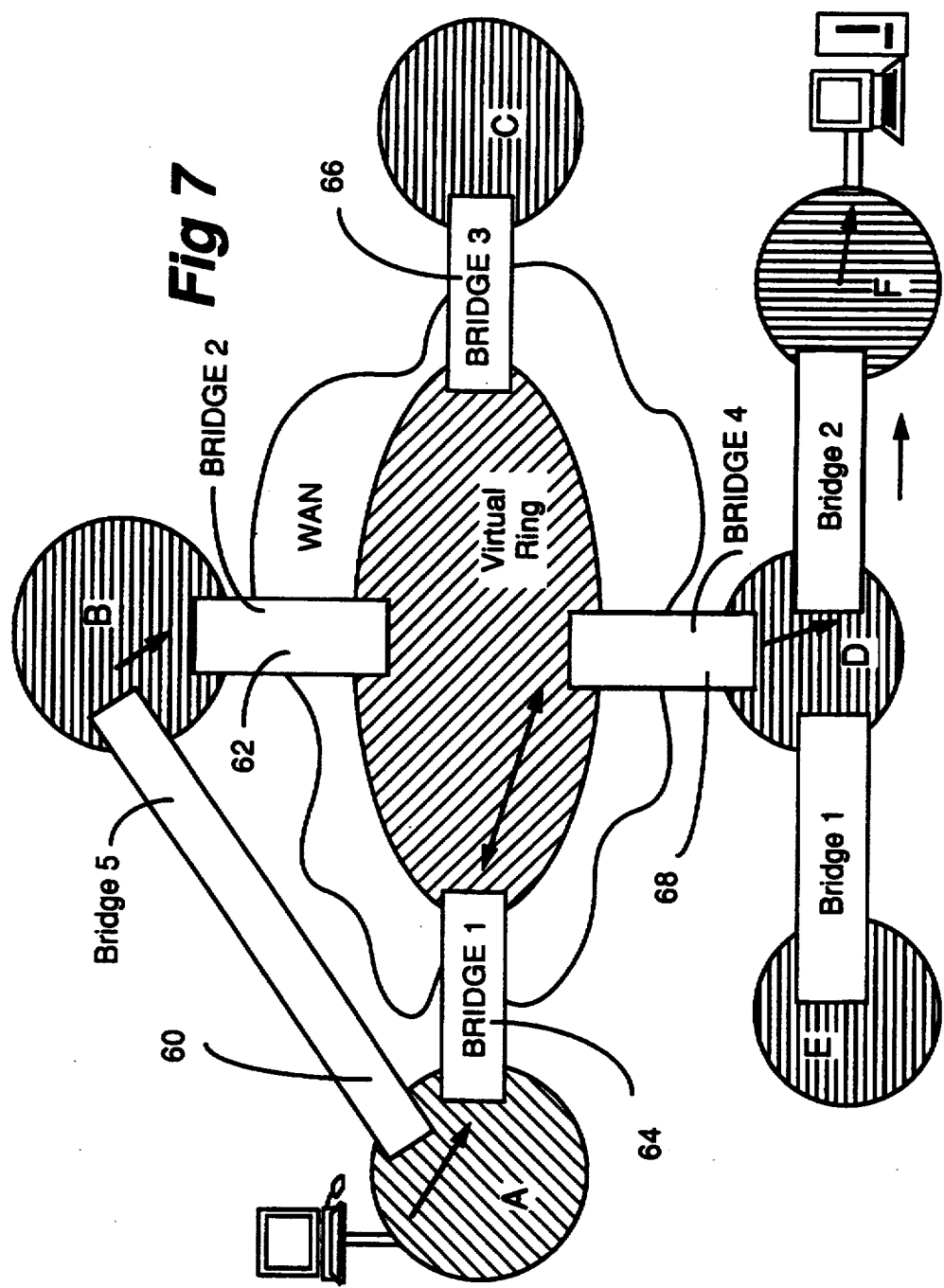

SINGLE-ROUTE BRAODCAST FOR LAN INTERCONNECTION

This is a continuation application of application Ser. No. 07/990,775, filed Dec. 10, 1992, now abandoned.

FIELD OF THE INVENTION

The present invention relates generally to LAN interconnection using source routing LAN bridges. Specifically, the invention is directed to a single-route broadcasting scheme for interconnected LANs, or, more specifically, a scheme of selecting or maintaining a designated source routing bridge between two or more interconnected LANs or LAN segments for single-route broadcasting.

BACKGROUND OF THE INVENTION

Local Area Networks (LAN) have been the most popular means of interconnecting communicating computing devices in recent years. The reason for its popularity may be attributed largely to the proliferation of personal computers and the wave of departmentalization of data resources in all types of industries. With the rapid growth of LANs, they are likely to be interconnected for greater geographical spread as well as for overcoming the size limitation imposed by LAN technologies. LANs and groups of LANs (LAN segments) are also likely to be connected through a packet switching wide area network (WAN) for the same reasons. When two or more LANs are interconnected to each other, the devices may communicate by using bridges, routers and/or gateways.

The bridges can be classified into two categories: (a) those that determine which frames from the local LAN are to be forwarded across to the remote LAN based on the station MAC (media access control) address found in the frames. These bridges do not require the source or destination station to be aware that they belong to two different LANs and hence make the bridging transparent to the LAN stations. For this reason, this type of bridge is called a transparent bridge. (b) Those that determine which frames from the local LAN are to be forwarded across to the remote LAN based on the routing indicators found in the frames. These bridges require the source station to place the routing information in the frame indicating how the frame is to be routed across a bridged network. For this reason, this type of bridge is called a source routing bridge. One of the important aspects of source routing bridges is their ability to establish an efficient route between the source and the destination prior to the start of communication. The source station specifies explicitly the route which a frame is to follow. In order to locate the destination station that belongs to another LAN and possible paths to it, the source station performs route discovery by using one of the following methods.

In the first method, the source station sends an all-route broadcast frame ("all-route explorer frame" in the IEEE terminology) and the source-routing bridges copy the frame across all possible paths. Therefore, the destination station at the other side of the network will receive as many copies of the frame from the source station as there are paths through the network between them. Each of these all-route broadcast frames contains in its routing information field a record of the exact route which it followed across the network, bridge by bridge. Each all-route broadcast frame received by the destination station is returned to the source station as a specifically routed frame tracing back the route it has taken. The source station, after receiving the specifically routed frames, picks one route as the preferred route.

In the second method, the source station sends a single-route broadcast frame ("spanning tree explorer frame" in the IEEE terminology) to the destination station. This single-route broadcast frame instructs the source-routing bridges to broadcast the received frame in such a way that only a single copy of the frame appears on each LAN segment. The source routing bridges do this by means of a protocol modelled on the spanning tree protocol which is widely used for the transparent bridges. This spanning tree protocol for source routing bridges selects one out of two or more parallel source routing bridges connecting two LAN segments for copying frames so that only one copy of a single-route broadcast frame exists in each LAN segment, i.e. no looping paths are created. The destination station will receive a single copy of the frame, announcing to it that a connection is desired. The destination station then responds to this request with an all-route broadcast frame. If there are multiple routes between the source station and the destination station, the source station will receive multiple copies of the frame. Each copy of the all-route broadcast frame received by the source station has a unique route description in its routing information field. The source station chooses one of the routes discovered as the preferred route. All subsequent frames contain routing information indicating this selected specific route.

The discovered route may be the route followed by the first frame to be received (the quickest route), or the route with the fewest number of hops among the first few responses (the shortest route). In the subsequent transmission this route is identified in the first frame to be sent with a specific route chosen by the station which initiated the route discovery.

Whichever method is used, the operational cost of the network with source routing bridges or a bridged internetwork is high. Two factors contribute to the operational costs. (a) Frequent broadcast during the destination station discovery and subsequent route determination load the network. Traffic due to all-route broadcast multiplies at every step of delivery through the network. (b) In a large internetwork consisting of a WAN or WANs, spanning tree protocol may consume a large amount of WAN bandwidth.

As described in detail in U.S. Pat. No. 4,901,312, issued Feb. 13, 1990 (Hui et al), it is also known that a packet switching network formed by network modules such as the Northern Telecom DPN-100 (Trade Mark) line of products can interconnect more than one LAN segment by way of source routing bridges through a virtual ring created in the packet switching network. In these cases, more than one LAN or LAN segments are connected to the packet switching network, each by one or more source routing bridges. However, it is undesirable to propagate the spanning tree protocol frames across the packet switching network (WAN) because they would be sent to all of the bridges in the network, that is to say, all LANs and all LAN segments connecting through the network will form one giant spanning tree. This would increase the amount of traffic through the packet switching network, and the spanning tree algorithm itself would tend to break down because of the long delays through the network. A breakdown of the algorithm can lead to unstable network topologies, and routing loops, which would aggravate the traffic problems. It is also true that when there is a topology change in the network, a large spanning tree takes longer to stabilize than a small spanning tree.

Therefore, the source routing bridges must determine among themselves which bridge will forward the single-route broadcast frames in and out of the source LAN, without using the spanning tree protocol. A novel procedure is proposed for this purpose. Where there are two or more source routing bridges connecting LANs, LAN segments, and a packet switching network, this procedure will ensure that there is only one single-route data path between the two adjacent networks and it also provides a means for automatic selection or maintenance of a designated source routing bridge among the parallel bridges to form such a data path.

OBJECTS OF THE INVENTION

It is therefore an object of the present invention to provide a method of selecting or maintaining a designated source routing bridge among two or more parallel source routing bridges connecting two LANs.

It is another object of the present invention to provide a method of selecting or maintaining a designated source routing bridge among two or more parallel source routing bridges connecting a LAN and a WAN comprising a packet switching network.

It is yet another object of the present invention to provide a method of selecting or maintaining a designated source routing bridge among two or more parallel source routing bridges on a wide area network (WAN) for isolating spanning tree protocol maintenance traffic from the WAN.

It is another object of the present invention to provide a method of conducting an efficient single-route broadcast among the token ring LANs interconnected by a packet switching network by way of a virtual ring contained in the packet switching network through source routing bridges provided on the LANs.

SUMMARY OF THE INVENTION

Briefly stated, the present invention is directed to a LAN interconnect system in which a LAN is connected to a packet switching network by one or more source routing bridges and each source routing bridge has a priority level assigned thereto. According to one aspect, a method of efficiently managing the LAN interconnect system for the purpose of route discovery by means of single route broadcast frames, comprises a step of selecting at any one time one of the source routing bridges as a designated source routing bridge for forming a single route broadcast path in the LAN interconnect system through which path the single route broadcast frames travel. The method includes further a step of at the same time maintaining all the remaining source routing bridges in a blocking state to prevent them from forwarding local spanning tree protocol maintenance frames into the packet switching network, thus effectively isolating the LAN from the packet switching network as far as the local spanning tree protocol maintenance frames are concerned. Additionally, the invention comprises a step of, at a predetermined time interval, the designated source routing bridge sending, by means of all route broadcasting, a sedative bridge protocol data unit containing its priority level information to all the remaining source routing bridges, which sedative bridge protocol data unit keeps all the remaining source routing bridges in the blocking state. Finally, there are further steps of each source routing bridge monitoring the sedative bridge protocol data unit which may arrive, and each source routing bridge entering into a contention process to select a new designated source routing bridge when no sedative bridge protocol data unit or a sedative bridge protocol data unit containing a different priority level information from that of the designated source routing bridge is detected.

BRIEF DESCRIPTION OF THE DRAWINGS

For a more complete understanding of the present invention and for further objects and advantages thereof, reference may now be made to the following description, taken in conjunction with the accompanying drawings, in which:

FIGS. 5-7 are schematic illustrations of a sequence of route discovery and establishment.

DETAILED DESCRIPTION OF THE PREFERRED EMBODIMENTS OF THE INVENTION

Figure 1:
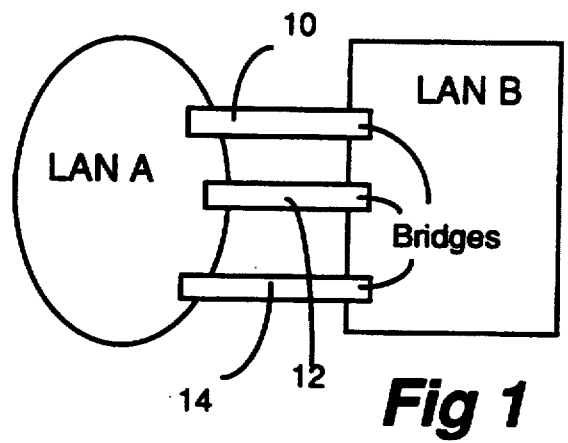
FIG. 1 is a schematic illustration of two LANs interconnected by parallel source routing bridges.
Figure 2:
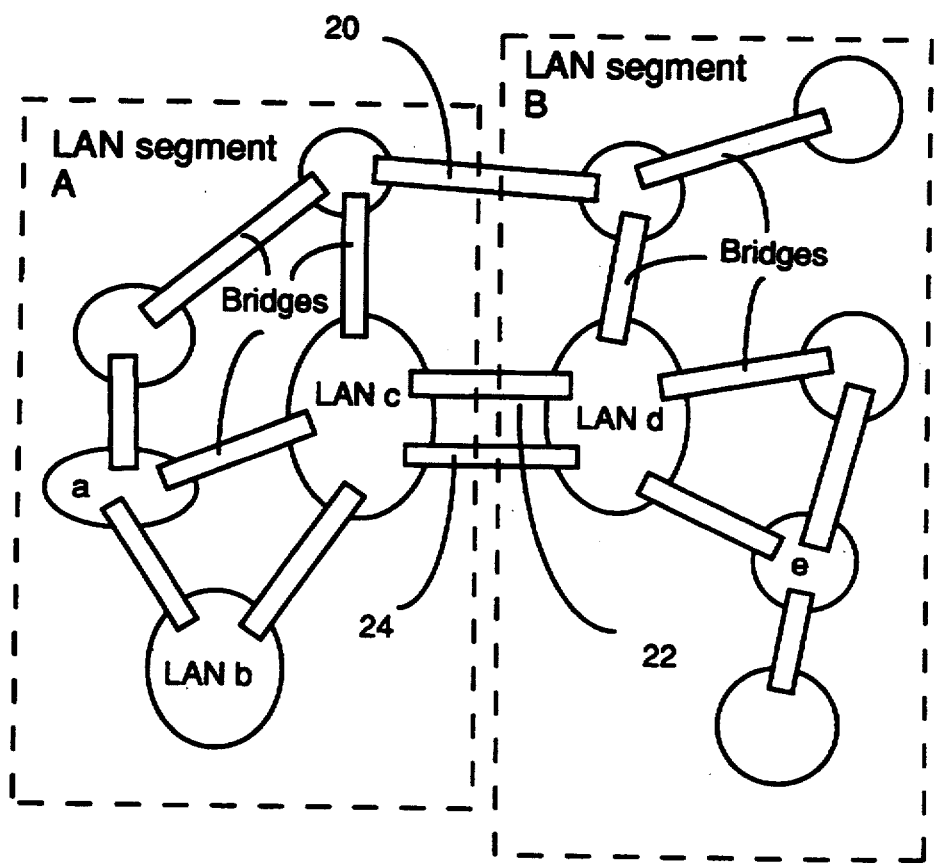
FIG. 2 is a schematic illustration of two LAN segments interconnected by parallel source routing bridges.
Figure 3:
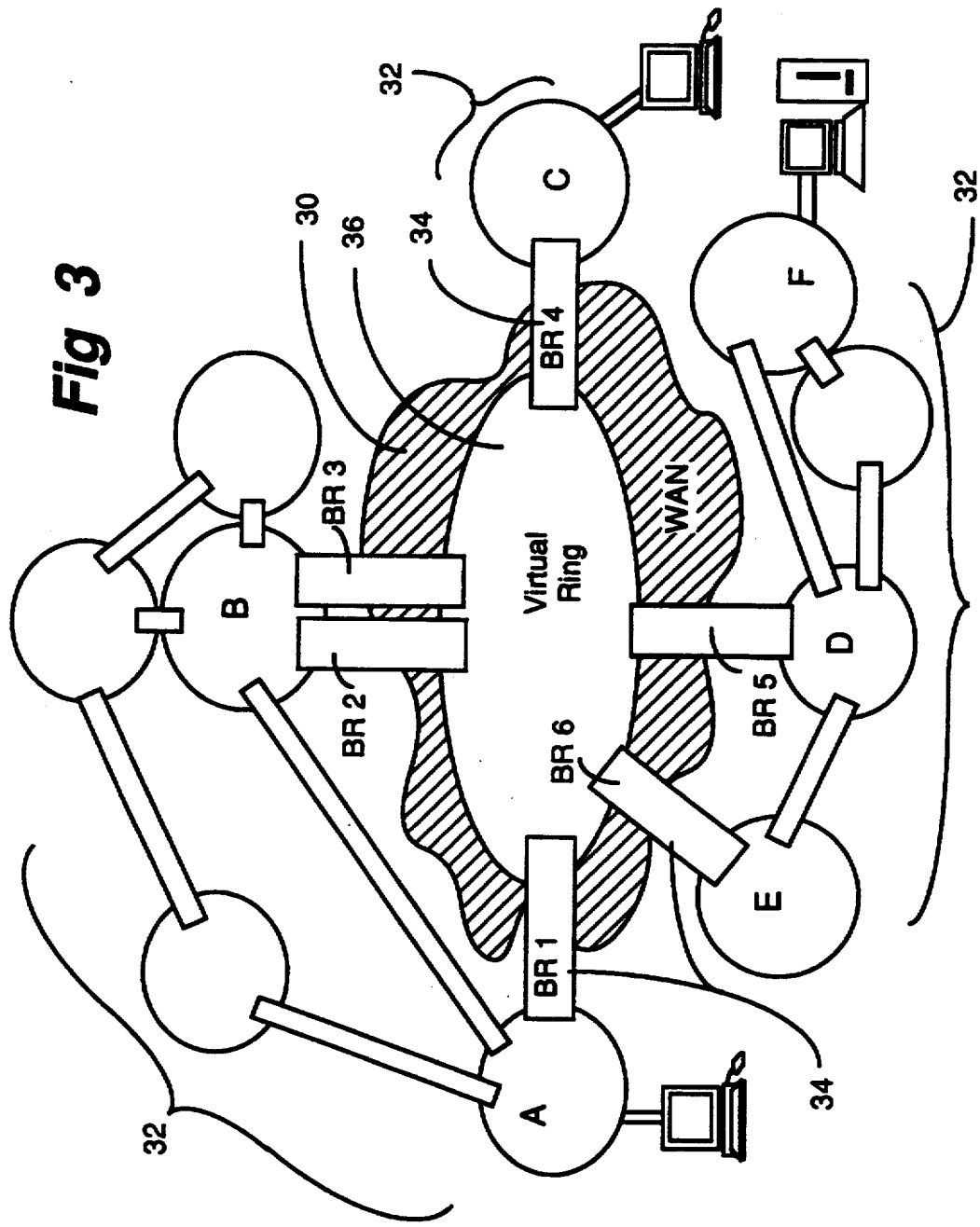
FIG. 3 is a schematic illustration of a LAN interconnection by the virtual ring scheme used in the packet switching network (WAN) in which the novel procedure of the present invention is used.

In FIGS. 1 and 2, there are schematically illustrated internetworks in which two LANs or two LAN segments are connected by three parallel source routing bridges 10-14 and 20-24. In FIG. 1, LAN a is connected to LAN segment b which may include another LAN, LANs and WAN. In each of LAN segments A and B in FIG. 2, there are a plurality of LANs (a, b, c, etc.) which are connected to each other by bridges or other suitable means. In FIG. 3, on the other hand, there is schematically illustrated an internetwork which includes a packet switching network 30. A plurality of LAN segments 32 are connected to the packet switching network by source routing bridges 34 (shown as BR1-BR6) through a virtual ring 36.

According to the procedure of the present invention, among the parallel source routing bridges, e.g. 10-14 (in FIG. 1), 20-24 (in FIG. 2), BR1 to BR3, or BR5 and BR6 (in FIG. 3), a designated bridge for each LAN segment is chosen initially either by the network operator or the sedative algorithm which will be described later. Each designated bridge is so designated as to participate in the single-route broadcasting by permitting the propagation therethrough of single-route broadcast frames. Every two seconds or such predetermined interval, the designated bridge sends out a bridge protocol data unit (referred to as a sedative frame) to all the other parallel bridges (called standbys because they are ready to provide back-up to the designated bridge in the single-route broadcasting when needed, as will be described below) and keeps them in a standby state. The sedative frames are sent as all-route broadcast frames by the designated source routing bridge to the source routing bridge group MAC address through the attached LAN segment. All standby source routing bridges fronting the same attached LAN segment will receive the sedative frames and will not copy the single-route broadcast frames. This copy suppression works in both ways. A sedated source routing bridge will not copy single-route broadcast frames received from the packet switching network or the destination LAN segment.

Loss of the designated source routing bridge is detected if any standby source routing bridge does not receive a sedative frame from the designated source routing bridge for a certain time period. The standby source routing bridge which detects the loss of the designated source routing bridge will initiate a contention process and a new designated bridge will be elected. Each parallel source routing bridge is given a unique priority code. The sedative procedure uses the priority codes of the source routing bridges to select a designated source routing bridge. The lower the priority code value, the higher the priority of the source routing bridge. When a new source routing bridge with a higher priority joins a LAN segment, the contention process is also initiated to select a new designated bridge.

It should be noted that external source routing bridges in each of the LAN segments can have the spanning tree protocol running in them. The sedative procedure and the spanning tree protocol run independently and asynchronously of each other, with the source routing bridges on the virtual ring conducting the sedative procedure and the external bridges running the spanning tree protocol.

Figure 4:
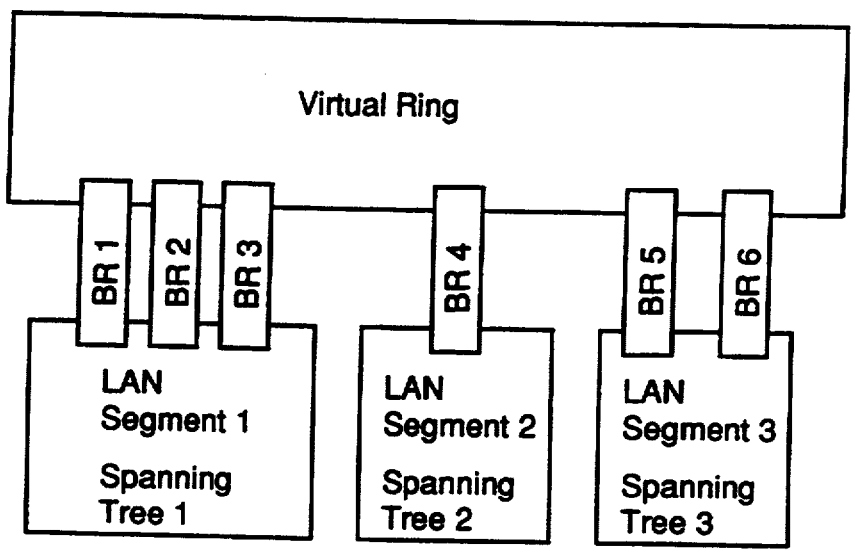
FIG. 4 is a schematic illustration of a virtual ring connecting a plurality of LAN segments within which spanning tree protocol is being run independently.

FIG. 4 shows how individual spanning trees are connected together through the virtual ring. There is one designated source routing bridge providing a single-route path between the virtual ring and every attached LAN segment which, for example, can be made up of token-ring LANs. When the source routing bridges are running the sedative procedure, they have the effect of localizing the spanning trees maintained by the spanning tree protocol to their respective individual LAN segments; no spanning tree protocol frames are being sent across the packet switching wide area network (WAN) or to the other LAN segment.

Use of the sedative procedure in each LAN segment has the following advantages over the conventional spanning tree protocol run across the internetwork to all LAN segments or across the packet switching WAN to all attached LAN segments:

a) With the sedative procedure, the packet switching WAN is not part of the spanning tree maintained by the spanning tee protocol. The sedative procedure therefore does not take up any bandwidth from the packet switching WAN.

b) An otherwise network-wide spanning tree is broken down to smaller spanning trees. In the event of a topology change, it would take less time for a smaller spanning tree to stabilize. The spanning tree is also stabilized faster because each segment has a smaller spanning tree and the WAN portion which has longer propagation delay, is taken out of the spanning tree.

c) The sedative procedure isolates local maintenance traffic, e.g. spanning tree protocol frames within a segment of LAN interconnect from the remaining part of the internetwork or from the packet switching network WAN for better utilization of bandwidth.

Referring to FIGS. 5-7, a typical sequence of the route discovery by the single-route broadcast, all-route broadcast and subsequent route establishment are shown. In FIG. 5, a device on ring A desires a connection to a device on ring F and explores the destination by initiating a single-route broadcast. A bridge 60 (or other external bridges if any) copies the single-route broadcast frame and sends it to ring B. Because of the procedure of the present invention only source routing bridge 62 among parallel bridges (because it is the designated bridge) copies the broadcast frame into the virtual ring. The bridge 64 is suppressed from copying any single-route broadcast frames. All the remaining bridges 66 and 68 on the virtual ring copy the frame into their attached LANs and thus only one copy of the single broadcast frame is delivered to each LAN. In FIG. 6, the destination device responds to the frame by sending an all-route broadcast frame into ring F. All the bridges copy the frame and thus each ring receives multiple frames if there are multiple paths. In FIG. 7, the source device chooses one copy which contains the route information about the chosen path and sends subsequent frames including the route information in them. The packet switching network then completes the virtual circuit connection between the source routing bridges.

According to the present invention, each source routing bridge on a virtual ring is given a unique priority code. The sedative procedure uses the priority codes of the source routing bridges to select a designated bridge. Contention is a process in which source routing bridges fronting the same attached LAN segment compete to become the designated source routing bridge. During contention, the source routing bridge with the highest priority (the one with the lowest priority code value) wins out and becomes the designated source routing bridge. A contention takes place amongst the standby source routing bridges when a designated source routing bridge leaves the attached LAN segment or when a new source routing bridge belonging to a higher priority than the existing designated source routing bridge joins the segment.

STATE TRANSITIONS

Figure 8:
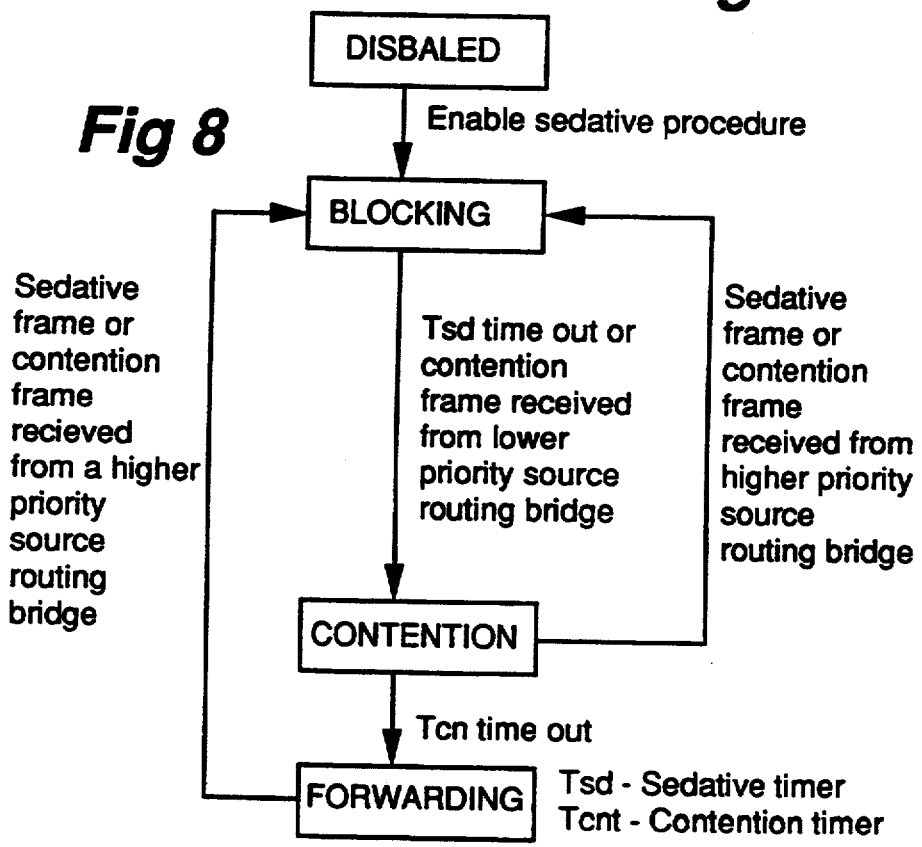
FIG. 8 is a state diagram of the source routing bridge according to the present invention.

According to one embodiment, the algorithm of the sedative procedure of the present invention is approximately modelled on a Finite State Automata (FSA) as shown in FIG. 8. It should be noted that the Figure does not show all the possible state transitions for clarity. The main states for the algorithm FSA are BLOCKING, CONTENTION and FORWARDING. The terms BLOCKING and FORWARDING are with respect to the treatment of single-route broadcast frames only. Forwarding of the all-route broadcast frames is not governed by the algorithm.

The algorithm states are explained as follows:

Disabled

The algorithm is in this state when the source routing bridge is first initialized or when the source routing bridge is disabled. The algorithm changes to the BLOCKING state when its functionality is enabled.

Blocking

When the algorithm is in the BLOCKING state, the source routing bridge blocks the passage of all single-route broadcast frames between the packet switching network and the LAN segment while all-route broadcast frames are allowed to pass through. That is, the source routing bridge behaves as a standby source routing bridge. The sedative timer (Tsd) defines how long a source routing bridge whose algorithm is in the BLOCKING state will wait before determining that a designated source routing bridge does not exist. Tsd is set every time a sedative frame or contention bridge protocol data unit (or simply contention frame) is received from a higher priority (lower priority code value) source routing bridge. The algorithm changes from the BLOCKING state to the CONTENTION state if a contention frame from a lower priority (higher priority code value) source routing bridge has been received or if Tsd has expired.

Contention

When the algorithm is in the CONTENTION state, the source routing bridge blocks all single-route broadcast frames while all-route broadcast frames are allowed to pass through, that is, the source routing bridge behaves as a standby source routing bridge. In the CONTENTION state, the source routing bridge sends out a contention frame at regular time intervals (tf) until the CONTENTION state is exited. The contention timer (Tcnt) is set when the algorithm first enters the CONTENTION state. Tcnt defines, at most, how long the algorithm will remain in the CONTENTION state. The algorithm changes from the CONTENTION state to the FORWARDING state when the contention timer (Tcnt) expires. The algorithm changes from the CONTENTION state to the BLOCKING state when a sedative frame or contention frame is received from a higher priority (lower priority code value) source routing bridge. Sedative frames and contention frames from lower priority (higher priority code value) source routing bridges are discarded.

Forwarding

When the algorithm is in the FORWARDING state, the source routing bridge passes all single-route broadcast frames and all-route broadcast frames, that is, the source routing bridge whose algorithm is in the FORWARDING state is a designated source routing bridge. Normally there should be only one source routing bridge whose algorithm is in the FORWARDING state for all source routing bridges fronting the same LAN segment. The algorithm changes from the FORWARDING state to the BLOCKING state when a sedative frame or contention frame is received from a higher priority (lower priority code value) source routing bridge. With the algorithm in the FORWARDING state, the source routing bridge sends out sedative frames at regular time interval (Tf). Sedative frames and contention frames from lower priority (higher priority code value) source routing bridges are discarded.

The following timers are used to control the algorithm state transitions:

1. Tf—Interval timer for sending out sedative frames by the is source routing bridge when the algorithm is in the FORWARDING state and for sending out contention frames when the algorithm is in the CONTENTION state.

2. Tsd—Sedative timer. This timer is used while the source routing bridge is in the BLOCKING STATE. The timer is set when the BLOCKING state is entered. While in the BLOCKING state, Tsd is set whenever a sedative frame or contention frame is received from a higher priority source routing bridge. The algorithm changes from the BLOCKING state to the CONTENTION state when this timer expires.

3. Tcnt—Contention timer. This timer is used while the source routing bridges in the CONTENTION state. This timer is set when the CONTENTION state is entered. The algorithm changes from the CONTENTION state to the FORWARDING state when this timer expires.

The timers Tf, Tsd and Tcnt are related as follows:
Tf<<Tcnt<<Tsd
where << is read as "much less than". Tentatively as one embodiment, the default value for Tf is 2 seconds, Tcnt is 10 seconds and Tsd is 30 seconds.

The following source routing bridge data unit types are defined:

1. Sedative frame from a designated source routing bridge running sedative procedure according to the invention. This frame is sent by a source routing bridge whose algorithm is in the FORWARDING state. It is sent at regular intervals (Tf) to keep other source routing bridges in the BLOCKING state.

2. Contention frame. This is sent by a source routing bridge whose algorithm is in the CONTENTION state. A source routing bridge sends out contention frames at regular intervals (Tf) while its algorithm is in the CONTENTION state. A contention frame is seen as an invitation for contention to source routing bridges of higher priority byte but is seen as a sedative frame to source routing bridges of lower priority. It is used to solicit higher priority source routing bridges to enter contention and to keep the algorithm of the lower priority source routing bridges in the BLOCKING state.

The sedative frames and contention frames are addressed to the group of functional MAC addresses assigned to the source routing bridges. They are sent as all-route broadcast frames to the attached token ring LAN. Service Assess Point (SAP) for bridges, SAP 42 in hex, is used to send and receive all source routing bridge data units.

The source routing bridges will only accept and respond to data units from other source routing bridges belonging to the same virtual ring. Data units from source routing bridges belonging to other virtual rings are discarded.

We claim:

1. In a LAN interconnect system in which a LAN is connected to a packet switching network by one or more source routing bridges, each source routing bridge having a priority level assigned thereto, a method of efficiently managing the LAN interconnect system for the purpose of route discovery by means of single route broadcast frames, comprising steps of:

selecting, at any one time, one of the source routing bridges as a designated source routing bridge for forming a single route broadcast path in said LAN interconnect system through which path the single route broadcast frames travel;

at the same time, maintaining all the remaining source routing bridges in a blocking state to prevent them from forwarding local spanning tree protocol maintenance frames into the packet switching network, thus effectively isolating the LAN from the packet switching network as far as the local spanning tree protocol maintenance frames are concerned;

at a predetermined time interval, said designated source routing bridge sending, by means of all route broadcasting, a sedative bridge protocol data unit containing its priority level information to all the remaining source routing bridges, which sedative bridge protocol data unit keeps all the remaining source routing bridges in the blocking state;

each source routing bridge monitoring said sedative bridge protocol data unit which may arrive; and each source routing bridge entering into a contention process to select a new designated source routing bridge when no sedative bridge protocol data unit or a sedative bridge protocol data unit containing a different priority level information from that of the designated source routing bridge is detected.

2. The method of efficiently managing a LAN interconnect according to claim 1, wherein said contention process comprises steps of:

each source routing bridge sending a contention bridge protocol data unit containing its priority level information;

monitoring contention bridge protocol data units which may arrive; and choosing a source routing bridge according to the priority level information of the monitored contention bridge protocol data units.

3. The method of efficiently managing a LAN interconnect according to claim 2, in which said LAN interconnect system comprises two or more LAN segments, each LAN segment having one or more LANs connected to each other within said each LAN segment and being connected to said packet switching network by a plurality of source routing bridges, and in which said each LAN segment maintains one of said plurality of source routing bridges as its designated source routing bridge to form a single route broadcast path to said packet switching network and all the remaining source routing bridges in the blocking state to prevent local spanning tree protocol maintenance frames from propagating into the packet switching network.

4. In a LAN interconnect system in which a plurality of LAN segments are connected with each other by a virtual ring formed in a packet network, each LAN segment connecting to said virtual ring by a plurality of source routing bridges, a method of efficiently managing the LAN interconnect system for the purpose of route discovery by means of single route broadcast frames, according to claim 1, further comprising steps of:

within each LAN segment, independently performing the steps recited in claim 1 so that only the designated source routing bridge within each LAN segment forwards single route broadcast frames into the virtual ring and prevents all the remaining source routing bridges in its LAN segment from propagating its local spanning tree protocol maintenance frames into the virtual ring.

5. The method of efficiently managing the LAN interconnect system for the purpose of route discovery by means of single route broadcast frames, according to claim 4, comprising further steps of:

within each LAN segment, each source routing bridge monitoring said sedative bridge protocol data unit which may arrive;

each source routing bridge sending a contention bridge protocol data unit containing its priority level information when no sedative bridge protocol data unit or a sedative bridge protocol data unit containing a different priority level information from that of the designated source routing bridge is detected;

monitoring any contention bridge protocol data unit which may arrive; and choosing a source routing bridge according to the priority level information of the monitored contention bridge protocol data units.

* * * * *